United States Patent [19]

Pacholok

[11] Patent Number: 4,698,741

[45] Date of Patent: Oct. 6, 1987

[54] HIGH EFFICIENCY HIGH VOLTAGE POWER SUPPLY FOR GAS DISCHARGE DEVICES

[76] Inventor: David Pacholok, 437 N. Crystal, Elgin, Ill. 60120

[21] Appl. No.: 757,540

[22] Filed: Jul. 22, 1985

[51] Int. Cl.[4] ............................................ H02M 3/335

[52] U.S. Cl. ........................................ 363/131; 363/18

[58] Field of Search ................ 315/239, 242, DIG. 7; 363/18, 19, 20, 21, 97, 131; 323/289

[56] References Cited

U.S. PATENT DOCUMENTS

| | | | |
|---|---|---|---|
| 3,601,682 | 8/1971 | Iwata | 363/133 |
| 3,697,852 | 10/1972 | Gerbitz | 363/21 |
| 4,253,136 | 2/1981 | Nanko | 363/21 |
| 4,361,865 | 11/1982 | Shono | 363/19 |
| 4,443,838 | 4/1984 | Yamada | 363/19 |
| 4,454,574 | 6/1984 | Bush et al. | 363/134 |

OTHER PUBLICATIONS

Farrow et al., "A 300 KHz Off Line Switching Supply Using a Unique Bi-Mos Switch Combination", Sep.-/Oct., 1980, Power Conversion International, pp. 20-27.

Chen and Walden, ". . . Emitter-Open Turn-OFF Scheme . . . ", 1981, IEEE, pp. 252-257 (Power Electronics Specialists Conference).

*Primary Examiner*—Patrick R. Salce

*Assistant Examiner*—J. Sterrett

*Attorney, Agent, or Firm*—Jones, Day, Reavis & Pogue

[57] ABSTRACT

A high efficiency, low cost solid state power supply for gas discharge or other devices including a resonant oscillator having a high voltage transistor and a switching circuit connected to the high voltage transistor adapted to rapidly turn-off such transistor. The switching circuit including transistors interposed to interrupt the emitter current path of the high voltage transistor to force rapid cut-off thereof. The switching circuit coupled to the oscillator output tank capacitance which functions additionally as a differentiator to actuate the switching circuit.

1 Claim, 2 Drawing Figures

HIGH EFFICIENCY HIGH VOLTAGE POWER SUPPLY FOR GAS DISCHARGE DEVICES

This invention relates to a low current, high voltage power supply for neon signs or other device having similar power requirements and, in particular, to a high efficiency, low cost solid state power supply replacement for high voltage transformers conventionally used to excite gas discharge devices.

Gas discharge devices, such as tubes for neon signs, require a high voltage, typically between five to ten thousand volts or more, to stimulate the gas atoms therein sufficiently to emit radiation in the visible spectrum. In prior art neon tubes used in signs and the like, such high voltages are generally produced by a low frequency step-up transformer connected to a standard 60 Hz power line. However, due to the core requirements of power transformers designed to operate at such low frequencies, the resulting transformers are expensive, heavy and generally bulky.

In addition, since neon signs are usually placed in exposed areas such as store front windows, the likelihood of electrical shock due to inadvertent contact with the high voltage sign interconnections is increased. It is well known that inadvertent contact with low frequency voltage sources, such as conventional 60 Hz line power, generates a far greater hazard of serious injury or death than contact with a high frequency source of comparable voltage. Thus, a power supply of higher frequency provides an additional measure of safety over conventional transformers particularly in those environments where complete isolation of a neon sign from inadvertent human contact is not feasible.

Solid state power supplies have long been used in a variety of applications. Such known designs, however, have not been satisfactory from a size, cost, or efficiency standpoint. The present invention, by contrast, is both low cost and small in size while simultaneously exhibiting high efficiency.

More specifically, the power supply of the invention utilizes a unique solid state free-running power oscillator to generate a high frequency power signal which drives a compact, light-weight high frequency transformer. The transformer is of the type having leakage reactance. It has a primary winding comprising the output tank inductance of the high frequency oscillator and a stepped-up secondary of sufficiently high voltage to excite the inert gas in a neon or other gas discharge tube. In this manner, the conventional bulky, low frequency step-up transformer of conventional neon tube supplies is eliminated.

To overcome the problems of low efficiency frequently encountered by relatively slow switching time, high voltage transistors, the present solid state oscillator utilizes a novel arrangement whereby a high voltage oscillator transistor is effectively and rapidly deactivated by a high-speed switching transistor which, in turn, is coupled through a capacitive differentiator to the oscillator output. This differentiator functions to detect the optimum moment when the low and high voltage oscillator transistors may be cut-off most quickly and, thereafter, to initiate the above described deactivation (cut-off) of the high-voltage transistor. The differentiator capacitor advantageously serves in the additional capacity as the oscillator output tank resonating capacitor thereby further minimizing use of bulky and expensive components.

The high frequency power transformer includes a third in-phase feedback winding which couples a fixed turn-on bias current to both the high and low voltage oscillator transistors. This bias is maintained until the above described differentiator/deactivation circuitry cuts-off the oscillator transistors at which instant the polarity of the feedback signal is reversed and transistor forward bias is essentially lost.

It is therefore an object of the present invention to provide an improved solid state power supply for gas discharge tubes or other similar high voltage/low current applications. A further object is a power supply of low cost and size rendering it a suitable replacement for present low frequency transformers or other solid state power supplies. A further object is a power supply oscillator having rapid switching characteristics whereby high efficiencies may be maintained. Other objects are revealed by the accopanying specification and following drawings:

FIG. 1 is a schematic representation of the preferred embodiment of the present invention; and, FIG. 2 are voltage and current waveforms of the oscillator output transformer primary.

DESCRIPTION OF PREFERRED EMBODIMENT

Figure 1:
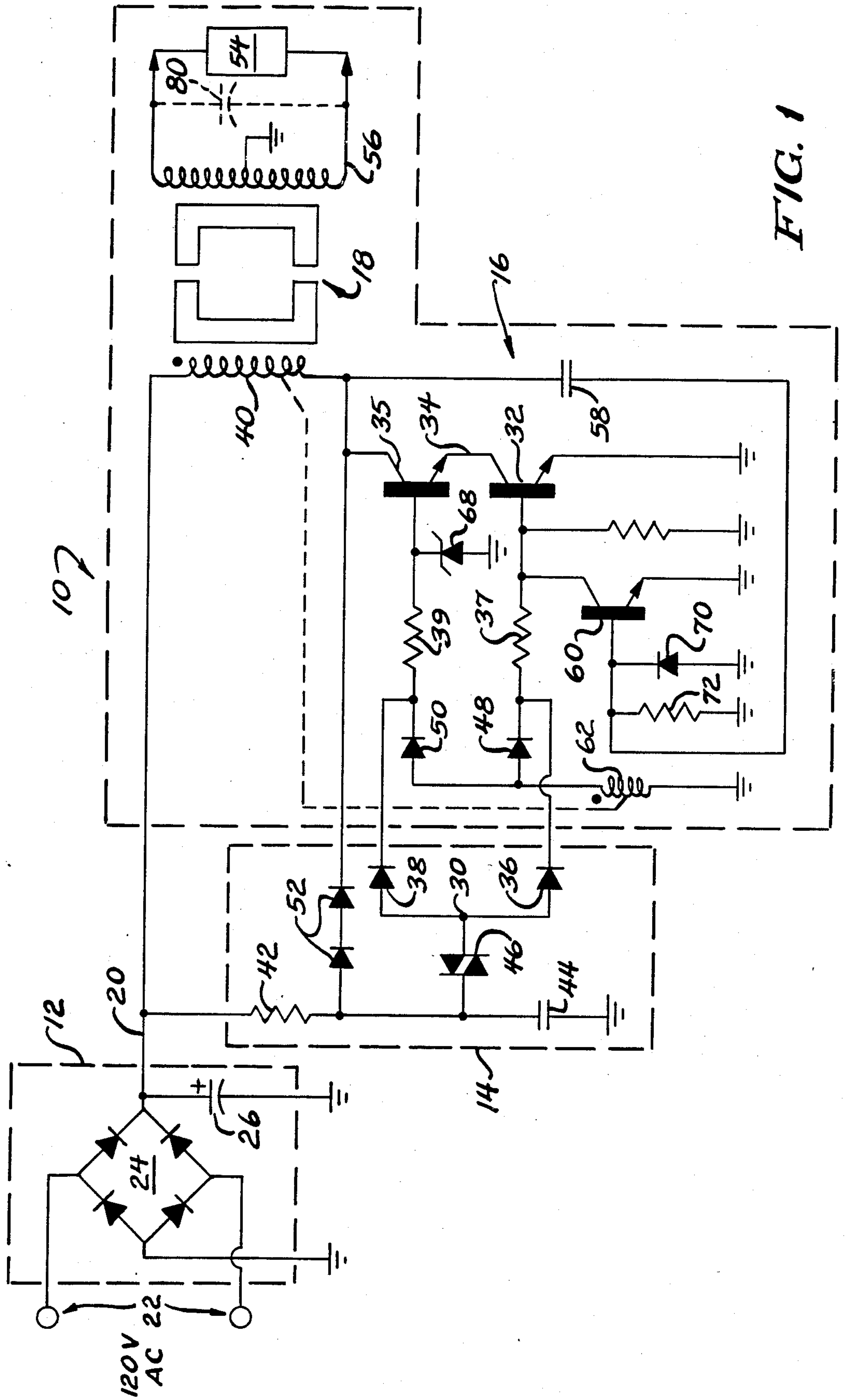

FIG. 1 schematically illustrates the solid state power supply 10 of the present invention. This supply includes a DC power source 12, a circuit initialization or starter 14, and an oscillator 16 including output transformer 18.

DC power source 12 is of conventional design and functions to generate approximately 160 volts DC, at point 20, from a standard 120 volt, 60 Hz, alternating current line source 22. Supply 12 includes a bridge arrangement of rectifier diodes 24 and a capacitor 26 to smooth or filter the pulsating 120 Hz DC therefrom.

Starter 14 serves to generate a positive pulse, at point 30, which is coupled, simultaneously, to the bases of transistors 32,34 through respective diodes 36, 38 and resistors 37, 39 thereby turning-on these transistors. As will be discussed in more detail below, the simultaneous enabling of transistors 32 and 34 places substantilly the full DC power supply voltage of 160 volts across the primary winding 40 of transformer 18 which, in turn, initiates operation of the power supply oscillator 16.

Starter 14 comprises a series resistor 42 (1 megohm, typically) and capacitor 44 (0.1 microfarad, typically) across the DC source potential (i.e. between point 20 and circuit ground). A disc 46 is interposed between the midpoint of this series configuration and the bases of transistors 32,34 through respective diodes 36,38 and resistors 37,39. In operation, starter capacitor 44 is charged through resistor 42 until the threshold diac voltage (approximately 20–30 volts) is reached at which instant a forward conduction path is defined through the diac, diodes 36,38, resistors 37,39, and base-emitter junctions of transistors 32,34. This, in turn, biases transistors 32,34 into conduction as capacitor 44 discharges through this path. A pair of series connected diodes 52 between starter capacitor 44 and the collector of transistor 34 serves to maintain capacitor 44 in a discharged state during normal operation of oscillator 16. As outlined below, the collector voltage drops to substantially zero during each oscillator cycle thereby discharging capacitor 44 through diodes 52.

Series or "totem pole" connected transistors 32 and 34 define the principal active gain elements of oscillator 16. Transformer 18, in particular primary winding 40, is interposed between the collector 35 of transistor 34 and the DC source 12 and comprises the oscillator load. This load includes the neon gas discharge tube 54 connected across transformer secondary 56.

Finally, the load further includes capacitor 58 (typically 0.022 microfared), interposed between collector 35 and the base of cut-off switching transistor 60. Capacitor 58 serves two important functions; first, to resonate with the inductive element of transformer primary 40 thereby to define the oscillator output tank and, second, as a differentiator to trigger conduction of cut-off switching transistor 60.

As noted above, oscillation is initiated when starter 14 provides a forward biasing current through diodes 36,38 and resistors 37,39 thereby driving the series configured transistors 32, 34 into conduction. This initializing bias current, however, quickly dissipates and is replaced by a second current through diodes 38 and 50 which are interconnected, in turn, to a third or feedback winding 62 of transformer 18. This winding is typically about three turns while the primary winding may be about 120 turns. A will be appreciated, the number of secondary winding turns must be selected in accordance with the voltage output desired with 3400 turns providing a secondary voltage, for example, of approximately

7500 volts.

Upon initialization, transistors 32,34 are momentarily biased into saturation thereby placing the full 160 volt DC power source potential across transformer primary 40 which, by reason of the inductance of primary 40, results in a linearly increasing collector current through transistors 32,34. Simultaneously, a positive voltage of approximately 4 volts is induced in feedback winding 62 which, in turn, generates the second, and substantially constant, bias currents to the respective transistors 32,34.

Figure 2:
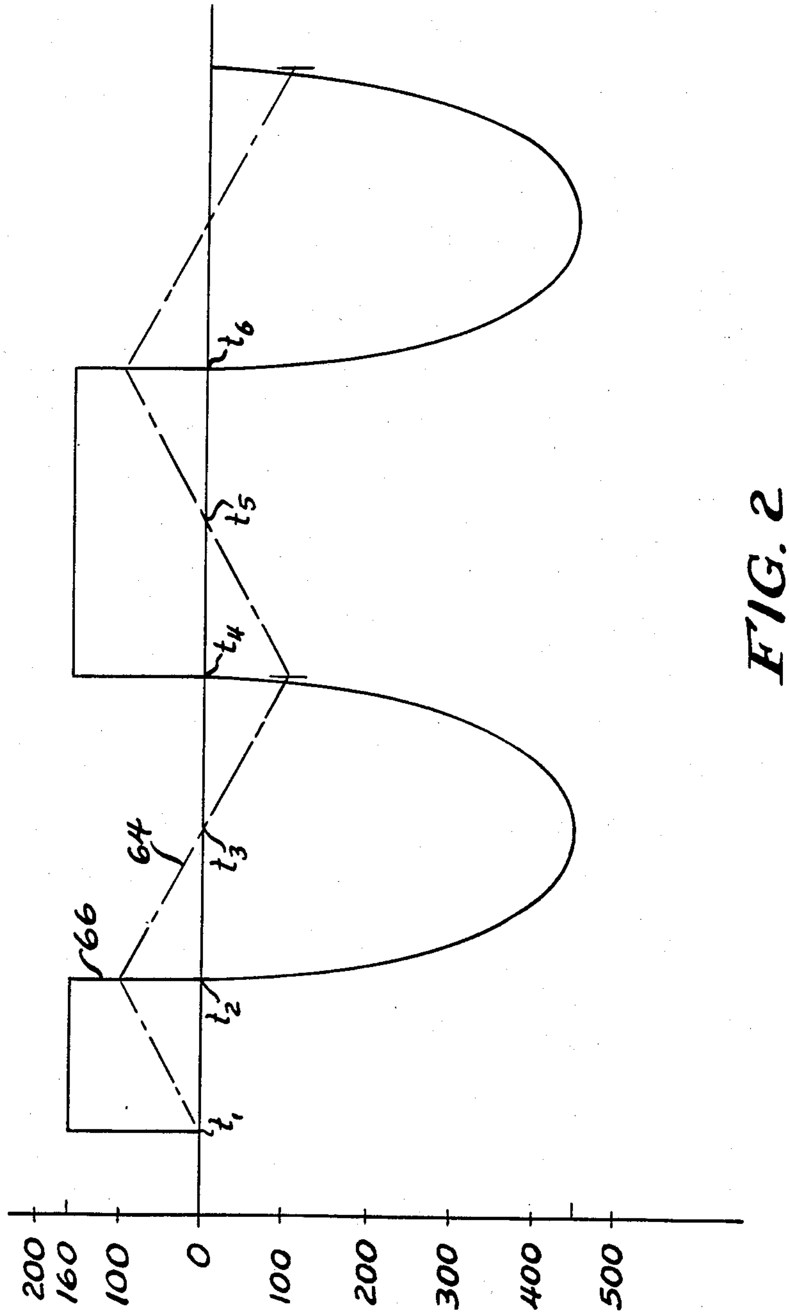

FIG. 2 illustrates the current 64 and voltage 66 waveforms, respectively, through and across transformer primary 40. Oscillator 16 is shown initialized at time $t_1$. Collector current through transistors 32,34 (which is substantialy identical to the current through primary 40 when the transistors are in saturation) steadily increases as discussed until a point is reached where one of the transistors 32,34 (preferably transistor 34) begins to come out of saturation, time $t_2$. In this connection, it is again emphasized that the linearly increasing current through primary 40 (during the interval $t_1$-$t_2$) results in a substantially fixed bias current to the transistors 32,34 sufficient to maintain these transistors in saturation, again, until time $t_2$.

As the transistors 32,34 come out of saturation, the voltage at collector 35 begins to rise rapidly. This is seen as a correspondingly rapid decrease in the voltage 66 across primary 40 after time $t_2$, FIG. 2. The energy stored in primary 40 at time $t_2$ [energy$=L(I)^2/2$] is transferred in the conventional resonant manner to tank capacitor 58 during the succeeding quarter cycle until time $t_3$. The secondary neon load 54 is reflected as a resistive load across the primary resonant tank lowering the Q of this circuit to between about 2 and 3.

Resonant tank capacitor 58 serves a second important function as a differentiator which effectively converts the rapidly changing voltage at collector 35 into a base current to drive switching transistor 60 [$i=C(dv/dt)$]. As a consequence, the instant collector 35 voltage begins to rise, i.e. at time $t_2$, switching transistor 60 is turned on which, in turn, turns off transistor 32 by shunting its base to ground. Transistors 32 and 60 are high speed switching types, for example 2N5190.

The switching off of transistor 32 substantially at time $t_2$ correspondingly opens the current path from the emitter of transistor 34 to ground thereby precluding further emitter current flow. With this emitter open, a new and momentary current path is defined through the collector/base junction of transistor 34, then, through zener diode 68 to ground. Zener diode 68 preferably exhibits a zener voltage of between about 3 and 7 volts. A 1N4737 has been successfully employed. Alternatively, diode 68 may be replaced by a resistor of approximately 22 ohms.

It will be appreciated that the collector to base current path through transistor 34 serves to rapidly deplete the transistor junction of all charge carriers thereby rapidly back-biasing this junction. This forced turn-off of high voltage transistor 34 occurs in generally less than 1 microsecond, 200 nanoseconds being typical. It will be further appreciated that transistor 34 must be of the high voltage variety to avoid break-down of the collector-base junction as the collector voltage rises to in excess of 500 volts. A MJE 8500 bipolar transistor has been utilized with satisfactory results.

Thus, the present arrangement of a high speed transistor 32 triggered by the oscillator tank "differentiating" capacitor, in combination with a high voltage transistor 34, having a base current path, achieves exceptionally fast turn-off an otherwise slow high voltage oscillator transistor thereby facilitating the present high efficiency power supply. It should further be emphasized that the above described output tank capacitor/differentiator arrangement advantageously triggers transistor cut-off the optimum time for transistor turn-off, i.e. at time $t_2$ as the transistors 32,34 are coming out of saturation. At such instant, a minimum number of charge carriers are present thereby minimizing the time necessary to effect complete transistor cut-off.

As mentioned above, upon turn-off of transistors 32,34 the energy stored in primary 40 is, in part, transferred to tank capacitor 58. More specifically, the current flowing through primary 40, which can no longer flow through the transistors following cut-off at time $t_2$, charges capacitor 58. This charging continues for one-quarter cycle until time $t_3$ at which instant the current through capacitor 58 and primary 40 reverses. Diode 70 and resistor 72 (470 ohms, typical) provide the requisite path for this reverse, discharging current flow through capacitor 58. Capacitor 58 continues to discharge for the next quarter-cycle until time $t_4$.

Due to the reverse flow of current through capacitor 58 between times $t_3$ and $t_4$, switching transistor 60 is not longer turned-on. Transistor 32, however, remains turned-off by reason that the induced potential across feedback winding 62 is negative during this interval (in fact, during the entire interval between $t_2$ and $t_4$) and, therefore, no transistor turn-on bias current is generated through diodes 48,50 and resistors 37,39.

Following the discharge of tank capacitor 58 at time $t_4$, the current through the capacitor and primary 40 begins to decay. This reversal in the rate-of-change of the current through primary 40 results in a corresponding change in the sign of the voltage across the primary and other windings of transformer 18, including the feedback winding 62. Thus, at time $t_4$, a positive voltage is again induced into this feedback winding thereby resulting in the generation of positive bias currents to both transistors 32 and 34 as previously discussed. Since switching transistor 60 is "off", both transistors 32,34 immediately turn-on thereby again applying the full DC source potential across the primary winding. The constant DC potential across primary 40 causes the current therethrough to linearly change, decreasing to zero at time $t_5$, then, continuing to its maximum positive value at time $t_6$. It will be appreciated that the condition of the oscillator at time $t_5$ is substantially identical to that existing upon circuit initialization at time $t_1$ and, therefore, oscillator 16 will continually repeat the above described cycle.

In order to substantially reduce the physical size of the present oscillator over conventional 60 Hertz high voltage transformers; a high frequency of oscillation, preferably about 25 kiloHertz, is selected. In this manner the physical dimensions of the transformer core are greatly reduced. The core material is a ferrite typically of the type that has been used in television fly-back circuits for many years. Such ferrite materials are 3C8 manufactured by Ferrox Cube and 24B by Stackpole. The core should preferably incorporate one or more air gaps totalling between about 0.1 and 0.2 inches thereby providing a leakage inductance which serves to lower the terminal output voltage as the load is increased (decreased resistance). It should further be noted that stray capacitances associated with the secondary winding, the leads interconnecting the transformer and neon load, and the neon tube itself define a secondary load capacitance 80 which is known to advantageously provide a substantially more uniform current output under varying neon load conditions. While these various capacitances are largely intrinsic; it is known that a secondary winding having a self-resonant frequency of between the oscillator fundamental and third harmonic frequencies produces the above described constant current effect. And, further, these desired characteristics have been found where conventional multi-section secondary winding bobins, typically eight sections to eliminate high voltage arc-over, are used.

I claim:

1. A high voltage power supply for gas discharge or similar high voltage devices comprising a solid state oscillator, the oscillator including a high voltage bipolar transistor, an output transformer having primary, secondary, and feedback windings, the primary winding operatively connected to the collector of the high voltage transistor, the primary winding having an inductance, a capacitor operatively connected to the collector of the high voltage transistor, the capacitor and primary winding inductance forming a resonant output tank of said solid state oscillator, the secondary transformer winding adapted for connection to the gas discharge or similar high voltage device; a first switching transistor operatively connected to the emitter of the high voltage transistor, said switching transistor adapted to selectively pass current from the emitter of the high voltage transistor only when the switching transistor is biased into conduction; means operatively connected to the base input of the high voltage transistor for passing current therefrom; bias means operatively connected to the high voltage and switching transistors for biasing said transistors into conduction, said bias means including the transformer feedback winding operatively interconnected to the high voltage and switching transistors to provide positive feedback bias to said transistors; means for inhibiting conduction bias current to the switching transistor, said inhibiting means including differentiating means operatively connected to the collector output of the high voltage transistor for detecting increasing voltage levels thereon whereby the switching transistor is biased into non-conduction whenever the differentiator means detects an increasing voltage level on the collector of the high voltage transistor, the output tank capacitor is operatively connected to the switching transistor whereby said output tank capacitor functions as the differentiator means of the inhibiting means.

* * * * *